(12) United States Patent
Salomon et al.

(10) Patent No.: US 8,694,814 B1
(45) Date of Patent: Apr. 8, 2014

(54) REUSE OF HOST HIBERNATION STORAGE SPACE BY MEMORY CONTROLLER

(75) Inventors: Tavi Salomon, Holon (IL); Ofir Shalvi, Ra'anana (IL); Michael Shachar, Caesarea (IL); Oren Golov, Hod-Hasharon (IL)

(73) Assignee: Apple Inc., Cupertino, CA (US)

( * ) Notice: Subject to any disclaimer, the term of this patent is extended or adjusted under 35 U.S.C. 154(b) by 532 days.

(21) Appl. No.: 12/880,101

(22) Filed: Sep. 12, 2010

Related U.S. Application Data

(60) Provisional application No. 61/324,429, filed on Apr. 15, 2010, provisional application No. 61/293,676, filed on Jan. 10, 2010.

(51) Int. Cl.
*G06F 1/00* (2006.01)

(52) U.S. Cl.
USPC ........... 713/323; 713/300; 713/320; 713/321; 713/324; 711/100; 711/102; 711/103; 711/147

(58) Field of Classification Search
USPC .......... 713/300, 321, 323, 324, 320; 711/100, 711/102, 103, 147
See application file for complete search history.

(56) References Cited

U.S. PATENT DOCUMENTS

| | | | |
|---|---|---|---|
| 3,668,631 A | 6/1972 | Griffith et al. | |
| 3,668,632 A | 6/1972 | Oldham | |
| 4,058,851 A | 11/1977 | Scheuneman | |
| 4,112,502 A | 9/1978 | Scheuneman | |
| 4,394,763 A | 7/1983 | Nagano et al. | |
| 4,413,339 A | 11/1983 | Riggle et al. | |
| 4,556,961 A | 12/1985 | Iwahashi et al. | |
| 4,558,431 A | 12/1985 | Satoh | |
| 4,608,687 A | 8/1986 | Dutton | |
| 4,654,847 A | 3/1987 | Dutton | |
| 4,661,929 A | 4/1987 | Aoki et al. | |
| 4,768,171 A | 8/1988 | Tada | |
| 4,811,285 A | 3/1989 | Walker et al. | |
| 4,899,342 A | 2/1990 | Potter et al. | |
| 4,910,706 A | 3/1990 | Hyatt | |
| 4,993,029 A | 2/1991 | Galbraith et al. | |
| 5,056,089 A | 10/1991 | Furuta et al. | |
| 5,077,722 A | 12/1991 | Geist et al. | |
| 5,126,808 A | 6/1992 | Montalvo et al. | |

(Continued)

FOREIGN PATENT DOCUMENTS

EP 0783754 B1 7/1997
EP 1434236 B1 6/2004

(Continued)

OTHER PUBLICATIONS

U.S. Appl. No. 12/534,898 Official Action dated Mar. 23, 2011.

(Continued)

*Primary Examiner* — Jaweed A Abbaszadeh

(74) *Attorney, Agent, or Firm* — Meyertons, Hood, Kivlin, Kowert & Goetzel, P.C.

(57) ABSTRACT

A method for data storage includes, in a host system that operates alternately in a normal state and a hibernation state, reserving a hibernation storage space in a non-volatile storage device for storage of hibernation-related information in preparation for entering the hibernation state. While the host system is operating in the normal state, a storage task other than storage of the hibernation-related information is performed using at least a portion of the reserved hibernation storage space.

42 Claims, 2 Drawing Sheets

PRE-ASSIGNED
HIBERNATION SPACE

PORTION OF HIBERNATION SPACE
USED BY FLASH MANAGEMENT
DURING NORMAL OPERATION

(56) References Cited

U.S. PATENT DOCUMENTS

| | | |
|---|---|---|
| 5,163,021 A | 11/1992 | Mehrotra et al. |
| 5,172,338 A | 12/1992 | Mehrotta et al. |
| 5,182,558 A | 1/1993 | Mayo |
| 5,182,752 A | 1/1993 | DeRoo et al. |
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Shirai |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,508,958 A | 4/1996 | Fazio et al. |
| 5,519,831 A | 5/1996 | Holzhammer |
| 5,532,962 A | 7/1996 | Auclair et al. |
| 5,533,190 A | 7/1996 | Binford et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koening |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A | 7/1999 | Lee et al. |
| 5,937,424 A | 8/1999 | Leak et al. |
| 5,942,004 A | 8/1999 | Cappelletti |
| 5,946,716 A | 8/1999 | Karp et al. |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka et al. |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 | 7/2001 | Wong |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,314,044 B1 | 11/2001 | Sasaki et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yong et al. |
| 6,442,585 B1 | 8/2002 | Dean et al. |
| 6,445,602 B1 | 9/2002 | Kokudo et al. |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,549,464 B2 | 4/2003 | Tanaka et al. |
| 6,553,510 B1 | 4/2003 | Pekny |
| 6,558,967 B1 | 5/2003 | Wong |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzalez et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |
| 6,731,557 B2 | 5/2004 | Beretta |
| 6,732,250 B2 | 5/2004 | Durrant |
| 6,738,293 B1 | 5/2004 | Iwahashi |
| 6,751,766 B2 | 6/2004 | Guterman et al. |
| 6,757,193 B2 | 6/2004 | Chen et al. |
| 6,774,808 B2 | 8/2004 | Hibbs et al. |
| 6,781,877 B2 | 8/2004 | Cernea et al. |
| 6,804,805 B2 | 10/2004 | Rub |
| 6,807,095 B2 | 10/2004 | Chen et al. |
| 6,807,101 B2 | 10/2004 | Ooishi et al. |
| 6,809,964 B2 | 10/2004 | Moschopoulos et al. |
| 6,819,592 B2 | 11/2004 | Noguchi et al. |
| 6,829,167 B2 | 12/2004 | Tu et al. |

(56) References Cited

U.S. PATENT DOCUMENTS

| | | |
|---|---|---|
| 6,845,052 B1 | 1/2005 | Ho et al. |
| 6,851,018 B2 | 2/2005 | Wyatt et al. |
| 6,851,081 B2 | 2/2005 | Yamamoto |
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |
| 6,873,552 B2 | 3/2005 | Ishii et al. |
| 6,879,520 B2 | 4/2005 | Hosono et al. |
| 6,882,567 B1 | 4/2005 | Wong |
| 6,883,037 B2 * | 4/2005 | Kadatch et al. .................. 710/5 |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzalez et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu |
| 7,158,058 B1 | 1/2007 | Yu |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzalez et al. |
| 7,177,199 B2 | 2/2007 | Chen et al. |
| 7,177,200 B2 | 2/2007 | Ronen et al. |
| 7,184,338 B2 | 2/2007 | Nakagawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzawa |
| 7,280,398 B1 | 10/2007 | Lee et al. |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhesi et al. |
| 7,310,347 B2 | 12/2007 | Lasser |
| 7,312,727 B1 | 12/2007 | Feng et al. |
| 7,321,509 B2 | 1/2008 | Chen et al. |
| 7,328,384 B1 | 2/2008 | Kulkarni et al. |
| 7,342,831 B2 | 3/2008 | Mokhlesi et al. |
| 7,343,330 B1 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobetz et al. |
| 7,447,970 B2 | 11/2008 | Wu et al. |
| 7,450,421 B2 | 11/2008 | Mokhlesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,468,911 B2 | 12/2008 | Lutze et al. |
| 7,469,049 B1 | 12/2008 | Feng |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |
| 7,590,002 B2 | 9/2009 | Mokhlesi et al. |
| 7,593,259 B2 | 9/2009 | Kim |
| 7,594,093 B1 | 9/2009 | Kancherla |

(56) References Cited

U.S. PATENT DOCUMENTS

| | | |
|---|---|---|
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzalez et al. |
| 7,869,273 B2 | 1/2011 | Lee et al. |
| 7,885,119 B2 | 2/2011 | Li |
| 7,904,783 B2 | 3/2011 | Brandman et al. |
| 7,928,497 B2 | 4/2011 | Yaegashi |
| 7,929,549 B1 | 4/2011 | Talbot |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 | 11/2011 | Radke |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Van Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0064647 A1* | 4/2004 | DeWhitt et al. .............. 711/135 |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobetz |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |

(56) References Cited

U.S. PATENT DOCUMENTS

| | | |
|---|---|---|
| 2008/0115017 A1 | 5/2008 | Jacobson |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |
| 2008/0239093 A1 | 10/2008 | Easwar et al. |
| 2008/0239812 A1 | 10/2008 | Abiko et al. |
| 2008/0253188 A1 | 10/2008 | Aritome |
| 2008/0263262 A1 | 10/2008 | Sokolov et al. |
| 2008/0263676 A1 | 10/2008 | Mo et al. |
| 2008/0270730 A1 | 10/2008 | Lasser et al. |
| 2008/0282106 A1 | 11/2008 | Shalvi et al. |
| 2008/0288714 A1 | 11/2008 | Salomon et al. |
| 2009/0013233 A1 | 1/2009 | Radke |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1 | 5/2009 | Radke |
| 2009/0144600 A1 | 6/2009 | Perlmutter et al. |
| 2009/0150894 A1 | 6/2009 | Huang et al. |
| 2009/0157950 A1 | 6/2009 | Selinger |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0199074 A1 | 8/2009 | Sommer et al. |
| 2009/0204824 A1 | 8/2009 | Lin et al. |
| 2009/0204872 A1 | 8/2009 | Yu et al. |
| 2009/0213653 A1 | 8/2009 | Perlmutter et al. |
| 2009/0213654 A1 | 8/2009 | Perlmutter et al. |
| 2009/0225595 A1 | 9/2009 | Kim |
| 2009/0228761 A1 | 9/2009 | Perlmutter et al. |
| 2009/0240872 A1 | 9/2009 | Perlmutter et al. |
| 2009/0265509 A1 | 10/2009 | Klein |
| 2009/0300227 A1 | 12/2009 | Nochimowski et al. |
| 2009/0323412 A1 | 12/2009 | Mokhlesi et al. |
| 2009/0327608 A1* | 12/2009 | Eschmann et al. ............ 711/118 |
| 2010/0017650 A1 | 1/2010 | Chin et al. |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0082883 A1 | 4/2010 | Chen et al. |
| 2010/0083247 A1 | 4/2010 | Kanevsky et al. |
| 2010/0110580 A1 | 5/2010 | Takashima |
| 2010/0124088 A1 | 5/2010 | Shalvi et al. |
| 2010/0131697 A1 | 5/2010 | Alrod et al. |
| 2010/0131827 A1 | 5/2010 | Sokolov et al. |
| 2010/0142268 A1 | 6/2010 | Aritome |
| 2010/0142277 A1 | 6/2010 | Yang et al. |
| 2010/0157675 A1 | 6/2010 | Shalvi et al. |
| 2010/0165689 A1 | 7/2010 | Rotbard et al. |
| 2010/0169547 A1 | 7/2010 | Ou |
| 2010/0169743 A1 | 7/2010 | Vogan et al. |
| 2010/0174847 A1 | 7/2010 | Paley et al. |
| 2010/0195390 A1 | 8/2010 | Shalvi |
| 2010/0199150 A1 | 8/2010 | Shalvi et al. |
| 2010/0211803 A1 | 8/2010 | Lablans |
| 2010/0220509 A1 | 9/2010 | Sokolov et al. |
| 2010/0220510 A1 | 9/2010 | Shalvi |
| 2010/0250836 A1 | 9/2010 | Sokolov et al. |
| 2010/0287217 A1 | 11/2010 | Borchers et al. |
| 2011/0010489 A1 | 1/2011 | Yeh |
| 2011/0060969 A1 | 3/2011 | Ramamoorthy et al. |
| 2011/0066793 A1 | 3/2011 | Burd |
| 2011/0075482 A1 | 3/2011 | Shepard et al. |
| 2011/0107049 A1 | 5/2011 | Kwon et al. |
| 2011/0149657 A1 | 6/2011 | Haratsch et al. |
| 2011/0199823 A1 | 8/2011 | Bar-Or et al. |
| 2011/0302354 A1 | 12/2011 | Miller |

FOREIGN PATENT DOCUMENTS

| | | |
|---|---|---|
| EP | 1605509 A1 | 12/2005 |
| WO | 9610256 A1 | 4/1996 |
| WO | 9828745 A1 | 7/1998 |
| WO | 2002100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 Z2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 4/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |
| WO | 2011024015 A1 | 3/2011 |

OTHER PUBLICATIONS

U.S. Appl. No. 13/047,822, filed Mar. 15, 2011.
U.S. Appl. No. 13/069,406, filed Mar. 23, 2011.
U.S. Appl. No. 13/088,361, filed Apr. 17, 2011.
U.S. Appl. No. 12/323,544 Office Action dated Dec. 13, 2011.
U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
U.S. Appl. No. 11/995,812 Office Action dated Oct. 28, 2011.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed Oct. 30, 2011.
U.S. Appl. No. 13/284,913, filed Oct. 30, 2011.

(56) References Cited

OTHER PUBLICATIONS

U.S. Appl. No. 13/338,335, filed Dec. 28, 2011.
U.S. Appl. No. 13/355,536, filed Jan. 22, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
Agrell et al., "Closest Point Search in Lattices", IEEE Transactions on Information Theory, vol. 48, No. 8, pp. 2201-2214, Aug. 2002.
Bez et al., "Introduction to Flash memory", Proceedings of the IEEE, vol. 91, No. 4, pp. 489-502, Apr. 2003.
Blahut, R. E., "Theory and Practice of Error Control Codes," Addison-Wesley, May, 1984, section 3.2, pp. 47-48.
Chang, L., "Hybrid Solid State Disks: Combining Heterogeneous NAND Flash in Large SSDs", ASPDAC, Jan. 2008.
Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.
Databahn™, "Flash memory controller IP", Denali Software, Inc., 1994 https://www.denali.com/en/products/databahn_flash.jsp.
Datalight, Inc., "FlashFX Pro 3.1 High Performance Flash Manager for Rapid Development of Reliable Products", Nov. 16, 2006.
Duann, N., Silicon Motion Presentation "SLC & MLC Hybrid", Flash Memory Summit, Santa Clara, USA, Aug. 2008.
Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.
Eitan et al., "Multilevel Flash Cells and their Trade-Offs", Proceedings of the 1996 IEEE International Electron Devices Meeting (IEDM), pp. 169-172, New York, USA 1996.
Engh et al., "A self adaptive programming method with 5 mV accuracy for multi-level storage in Flash", pp. 115-118, Proceedings of the IEEE 2002 Custom Integrated Circuits Conference, May 12-15, 2002.
Goodman et al., "On-Chip ECC for Multi-Level Random Access Memories," Proceedings of the IEEE/CAM Information Theory Workshop, Ithaca, USA, Jun. 25-29, 1989.
Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.
Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.
Horstein, "On the Design of Signals for Sequential and Nonsequential Detection Systems with Feedback," IEEE Transactions on Information Theory IT-12:4 (Oct. 1966), pp. 448-455.
Jung et al., In "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.
Kawaguchi et al. 1995. A flash-memory based file system. In Proceedings of the USENIX 1995 Technical Conference , New Orleans, Louisiana. 155-164.
Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.
Lee et al., "Effects of Floating Gate Interference on NAND Flash Memory Cell Operation", IEEE Electron Device Letters, vol. 23, No. 5, pp. 264-266, May 2002.
Maayan et al., "A 512 Mb NROM Flash Data Storage Memory with 8 Mb/s Data Rate", Proceedings of the 2002 IEEE International Solid-State circuits Conference (ISSCC 2002), pp. 100-101, San Francisco, USA, Feb. 3-7, 2002.
Mielke et al., "Recovery Effects in the Distributed Cycling of Flash Memories", IEEE 44th Annual International Reliability Physics Symposium, pp. 29-35, San Jose, USA, Mar. 2006.

Onfi, "Open NAND Flash Interface Specification," revision 1.0, Dec. 28, 2006.
Phison Electronics Corporation, "PS8000 Controller Specification (for SD Card)", revision 1.2, Document No. S-07018, Mar. 28, 2007.
Shalvi, et al., "Signal Codes," Proceedings of the 2003 IEEE Information Theory Workshop (ITW'2003), Paris, France, Mar. 31-Apr. 4, 2003.
Shiozaki, A., "Adaptive Type-II Hybrid Broadcast ARQ System", IEEE Transactions on Communications, vol. 44, Issue 4, pp. 420-422, Apr. 1996.
Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.
St Microelectronics, "Bad Block Management in NAND Flash Memories", Application note AN-1819, Geneva, Switzerland, May 2004.
ST Microelectronics, "Wear Leveling in Single Level Cell NAND Flash Memories," Application note AN-1822 Geneva, Switzerland, Feb. 2007.
Takeuchi et al., "A Double Level $V_{th}$ Select Gate Array Architecture for Multi-Level NAND Flash Memories", Digest of Technical Papers, 1995 Symposium on VLSI Circuits, pp. 69-70, Jun. 8-10, 1995.
Takeuchi et al., "A Multipage Cell Architecture for High-Speed Programming Multilevel NAND Flash Memories", IEEE Journal of Solid State Circuits, vol. 33, No. 8, Aug. 1998.
Wu et al., "eNVy: A non-Volatile, Main Memory Storage System", Proceedings of the 6th International Conference on Architectural support for programming languages and operating systems, pp. 86-87, San Jose, USA, 1994.
International Application PCT/IL2007/000575 Patentability report dated Mar. 26, 2009.
International Application PCT/IL2007/000575 Search Report dated May 30, 2008.
International Application PCT/IL2007/000576 Patentability Report dated Mar. 19, 2009.
International Application PCT/IL2007/000576 Search Report dated Jul. 7, 2008.
International Application PCT/IL2007/000579 Patentability report dated Mar. 10, 2009.
International Application PCT/IL2007/000579 Search report dated Jul. 3, 2008.
International Application PCT/IL2007/000580 Patentability Report dated Mar. 10, 2009.
International Application PCT/IL2007/000580 Search Report dated Sep. 11, 2008.
International Application PCT/IL2007/000581 Patentability Report dated Mar. 26, 2009.
International Application PCT/IL2007/000581 Search Report dated Aug. 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.

(56) References Cited

OTHER PUBLICATIONS

International Application PCT/IL2008/001446 Search report dated Feb. 20, 2009.
U.S. Appl. No. 11/949,135 Official Action dated Oct. 2, 2009.
U.S. Appl. No. 12/019,011 Official Action dated Nov. 20, 2009.
Sommer, N., U.S. Appl. No. 12/171,797 "Memory Device with Non-Uniform Programming Levels" filed Jul. 11, 2008.
Shalvi et al., U.S. Appl. No. 12/251,471 "Compensation for Voltage Drifts in Analog Memory Cells" filed Oct. 15, 2008.
Sommer et al., U.S. Appl. No. 12/497,707 "Data Storage in Analog Memory Cells with Protection Against Programming Interruption" filed Jul. 6, 2009.
Winter et al., U.S. Appl. No. 12/534,893 "Improved Data Storage in Analog Memory Cells Using Modified Pass Voltages" filed Aug. 4, 2009.
Winter et al., U.S. Appl. No. 12/534,898 "Data Storage Using Modified Voltages" filed Aug. 4, 2009.
Shalvi et al., U.S. Appl. No. 12/551,583 "Segmented Data Storage" filed Sep. 1, 2009.
Shalvi et al., U.S. Appl. No. 12/551,567 "Reliable Data Storage in Analog Memory Cells Subjected to Long Retention Periods" filed Sep. 1, 2009.
Perlmutter et al., U.S. Appl. No. 12/558,528 "Estimation of Memory Cell Read Thresholds by Sampling Inside Programming Level Distribution Intervals" filed Sep. 13, 2009.
Sokolov, D., U.S. Appl. No. 12/579,430 "Efficient Programming of Analog Memory Cell Devices" filed Oct. 15, 2009.
Shalvi, O., U.S. Appl. No. 12/579,432 "Efficient Data Storage in Storage Device Arrays" filed Oct. 15, 2009.
Sommer et al., U.S. Appl. No. 12/607,078 "Data Scrambling in Memory Devices" filed Oct. 28, 2009.
Sommer et al., U.S. Appl. No. 12/607,085 "Data Scrambling Schemes for Memory Devices" filed Oct. 28, 2009.
Sommer et al., U.S. Appl. No. 12/649,358 "Efficient Readout Schemes for Analog Memory Cell Devices" filed Dec. 30, 2009.
Sommer et al., U.S. Appl. No. 12/649,360 "Efficient Readout Schemes for Analog Memory Cell Devices Using Multiple Read Threshold Sets" filed Dec. 30, 2009.
Shachar et al. U.S. Appl. No. 12/688,883 "Hierarchical data storage system" filed Jan. 17, 2010.
Sommer et al., U.S. Appl. No. 12/728,296 "Database of Memory Read Thresholds" filed Mar. 22, 2010.
Sommer et al., U.S. Appl. No. 12/758,003 "Selective re-programming of analog memory cells" filed Apr. 11, 2010.
Huffman, A., "Non-Volatile Memory Host Controller Interface (NVMHCI)", Specification 1.0, Apr. 14, 2008.
U.S. Appl. No. 11/957,970 Official Action dated May 20, 2010.
Panchbhai et al., "Improving Reliability of NAND Based Flash Memory Using Hybrid SLC/MLC Device", Project Proposal for CSci 8980—Advanced Storage Systems, University of Minnesota, USA, Spring 2009.
JEDEC Standard JESD84-C44, "Embedded MultiMediaCard (eMMC) Mechanical Standard, with Optional Reset Signal", Jedec Solid State Technology Association, USA, Jul. 2009.
JEDEC, "UFS Specification", version 0.1, Nov. 11, 2009.
SD Group and SD Card Association, "SD Specifications Part 1 Physical Layer Specification", version 3.01, draft 1.00, Nov. 9, 2009.
Compaq et al., "Universal Serial Bus Specification", revision 2.0, Apr. 27, 2000.
Serial ATA International Organization, "Serial ATA Revision 3.0 Specification", Jun. 2, 2009.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.
U.S. Appl. No. 12/880,101 "Reuse of Host Hibernation Storage Space by Memory Controller", filed Sep. 12, 2010.
U.S. Appl. No. 12/890,724 "Error Coding Over Multiple Memory Pages", filed Sep. 27, 2010.
U.S. Appl. No. 12/171,797 Official Action dated Aug. 25, 2010.
U.S. Appl. No. 12/497,707 Official Action dated Sep. 15, 2010.
U.S. Appl. No. 11/995,801 Official Action dated Oct. 15, 2010.
Numonyx, "M25PE16: 16-Mbit, page-erasable serial flash memory with byte-alterability, 75 MHz SPI bus, standard pinout", Apr. 2008.
Shalvi et al., U.S. Appl. No. 12/822,207 "Adaptive Over-Provisioning in Memory Systems" filed Jun. 24, 2010.
Hong et al., "NAND Flash-based Disk Cache Using SLC/MLC Combined Flash Memory", 2010 International Workshop on Storage Network Architecture and Parallel I/Os, pp. 21-30, USA, May 3, 2010.
U.S. Appl. No. 11/945,575 Official Action dated Aug. 24, 2010.
U.S. Appl. No. 12/045,520 Official Action dated Nov. 16, 2010.
U.S. Appl. No. 12/323,544 Official Action dated Mar. 9, 2012.
Chinese Patent Application # 200780026181.3 Official Action dated Mar. 7, 2012.
Chinese Patent Application # 200780026094.8 Official Action dated Feb. 2, 2012.
U.S. Appl. No. 12/332,370 Official Action dated Mar. 8, 2012.
U.S. Appl. No. 12/579,432 Official Action dated Feb. 29, 2012.
U.S. Appl. No. 12/522,175 Official Action dated Mar. 27, 2012.
U.S. Appl. No. 12/607,085 Official Action dated Mar. 28, 2012.
Budilovsky et al., "Prototyping a High-Performance Low-Cost Solid-State Disk", SYSTOR—The 4th Annual International Systems and Storage Conference, Haifa, Israel, May 30-Jun. 1, 2011.
NVM Express Protocol, "NVM Express", Revision 1.0b, Jul. 12, 2011.
SCSI Protocol, "Information Technology—SCSI Architecture Model-5 (SAM-5)", INCITS document T10/2104-D, revision 01, Jan. 28, 2009.
SAS Protocol, "Information Technology—Serial Attached SCSI-2 (SAS-2)", INCITS document T10/1760-D, revision 15a, Feb. 22, 2009.
Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
U.S. Appl. No. 12/344,233 Official Action dated Jun. 24, 2011.
U.S. Appl. No. 11/995,813 Official Action dated Jun. 16, 2011.
Berman et al., "Mitigating Inter-Cell Coupling Effects in MLC NAND Flash via Constrained Coding", Flash Memory Summit, Santa Clara, USA, Aug. 19, 2010.
U.S. Appl. No. 12/178,318 Official Action dated May 31, 2011.
CN Patent Application # 200780026181.3 Official Action dated Apr. 8, 2011.
Eitan et al., "Can NROM, a 2-bit, Trapping Storage NVM Cell, Give a Real Challenge to Floating Gate Cells?", Proceedings of the 1999 International Conference on Solid State Devices and Materials (SSDM), p. 522-524, Tokyo, Japan 1999.
Huffman, A., "Non-Volatile Memory Host Controller Interface (NVMCHI)", Specification 1.0, Apr. 14, 2008.
U.S. Appl. No. 11/995,814 Official Action dated Dec. 17, 2010.
U.S. Appl. No. 12/388,528 Official Action dated Nov. 29, 2010.
U.S. Appl. No. 12/251,471 Official Action dated Jan. 3, 2011.
Engineering Windows 7, "Support and Q&A for Solid-State Drives", e7blog, May 5, 2009.
Micron Technology Inc., "Memory Management in NAND Flash Arrays", Technical Note, year 2005.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Park et al., "Sub-Grouped Superblock Management for High-Performance Flash Storages", IEICE Electronics Express, vol. 6, No. 6, pp. 297-303, Mar. 25, 2009.
"How to Resolve "Bad Super Block: Magic Number Wrong" in BSD", Free Online Articles Director Article Base, posted Sep. 5, 2009.
Ubuntu Forums, "Memory Stick Failed IO Superblock", posted Nov. 11, 2009.
Super User Forums, "SD Card Failure, can't read superblock", posted Aug. 8, 2010.
U.S. Appl. No. 12/987,174, filed Jan. 10, 2011.
U.S. Appl. No. 12/987,175, filed Jan. 10, 2011.
U.S. Appl. No. 12/963,649, filed Dec. 9, 2010.
U.S. Appl. No. 13/021,754, filed Feb. 6, 2011.

(56) References Cited

OTHER PUBLICATIONS

Wei, L., "Trellis-Coded Modulation With Multidimensional Constellations", IEEE Transactions on Information Theory, vol. IT-33, No. 4, pp. 483-501, Jul. 1987.
U.S. Appl. No. 13/114,049 Official Action dated Sep. 12, 2011.
U.S. Appl. No. 12/405,275 Official Action dated Jul. 29, 2011.
Conway et al., "Sphere Packings, Lattices and Groups", 3rd edition, chapter 4, pp. 94-135, Springer, New York, USA 1998.
Chinese Patent Application # 200780040493.X Official Action dated Jun. 15, 2011.
U.S. Appl. No. 12/037,487 Official Action dated Oct. 3, 2011.
U.S. Appl. No. 12/649,360 Official Action dated Aug. 9, 2011.
U.S. Appl. No. 13/192,504, filed Jul. 28, 2011.
U.S. Appl. No. 13/192,852, filed Aug. 2, 2011.
U.S. Appl. No. 13/231,963, filed Sep. 14, 2011.
U.S. Appl. No. 13/239,408, filed Sep. 22, 2011.
U.S. Appl. No. 13/239,411, filed Sep. 22, 2011.
U.S. Appl. No. 13/214,257, filed Aug. 22, 2011.
U.S. Appl. No. 13/192,501, filed Jul. 28, 2011.
U.S. Appl. No. 13/192,495, filed Jul. 28, 2011.
US 7,161,836, 01/2007, Wan et al. (withdrawn)

* cited by examiner

REUSE OF HOST HIBERNATION STORAGE SPACE BY MEMORY CONTROLLER

CROSS-REFERENCE TO RELATED APPLICATIONS

This application claims the benefit of U.S. Provisional Patent Application 61/293,676, filed Jan. 10, 2010, and U.S. Provisional Patent Application 61/324,429, filed Apr. 15, 2010, whose disclosures are incorporated herein by reference.

FIELD OF THE INVENTION

The present invention relates generally to memory devices, and particularly to reusing memory space allocated for storing hibernation data.

BACKGROUND OF THE INVENTION

Some computing devices, such as notebook computers, support a hibernation state. The hibernation state is typically a low power consumption state that preserves the state of the computing device and its applications so that operation can later resume without having to restart the applications or the operating system. When preparing to enter hibernation, the computing device stores application data and other information in non-volatile memory. When returning from hibernation to normal operation, the computing device retrieves the stored information, and resumes operation from the point at which it began to hibernate.

Some storage devices, such as Solid-State Disks (SSD), use arrays of analog memory cells for non-volatile data storage. Each analog memory cell stores a quantity of an analog value, also referred to as a storage value, such as an electrical charge or voltage. This analog value represents the information stored in the cell. In Flash memories, for example, each analog memory cell holds a certain amount of electrical charge. The range of possible analog values is typically divided into intervals, each interval corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume two possible programming levels. Higher-density devices, often referred to as Multi-Level Cell (MLC) devices, store two or more bits per memory cell, i.e., can be programmed to assume more than two possible programming levels.

SUMMARY OF THE INVENTION

An embodiment of the present invention that is described herein provides a method for data storage, including:

in a host system that operates alternately in a normal state and a hibernation state, reserving a hibernation storage space in a non-volatile storage device for storage of hibernation-related information in preparation for entering the hibernation state; and while the host system is operating in the normal state, performing a storage task other than storage of the hibernation-related information using at least a portion of the reserved hibernation storage space.

In some embodiments, the non-volatile storage device includes multiple memory blocks, and performing the storage task includes allocating over-provisioning memory overhead for copying valid data from partially-programmed memory blocks so as to produce memory blocks ready for erasure, such that at least some of the over-provisioning memory overhead is allocated in the hibernation storage space. In a disclosed embodiment, performing the storage task includes caching the user data accepted from the host system in the hibernation storage space, and subsequently copying the cached user data to storage locations outside the hibernation storage space. In an embodiment, caching the user data includes writing the user data to the hibernation storage space at a first storage throughput, and copying the cached user data includes storing the user data outside the hibernation storage space at a second storage throughput that is lower than the first storage throughput.

In some embodiments, reserving the hibernation storage space includes allocating a set of the storage locations by the host system to serve as the hibernation storage space, and performing the storage task includes identifying at least part of the storage locations in the set, and performing the storage task using the identified storage locations. In an embodiment, identifying the storage locations in the set includes receiving a notification from the host system indicative of the set of storage locations. In an alternative embodiment, identifying the storage locations in the set includes automatically identifying a file holding the hibernation-related information in a file system of the host system. In yet another embodiment, the method includes, in preparation for entering the hibernation state, receiving the hibernation-related information from the host system using one or more dedicated hibernation write commands, and identifying the storage locations in the set includes detecting the storage locations written to using the dedicated hibernation write commands.

In a disclosed embodiment, the method includes detecting that the host system is preparing to enter the hibernation state. In an embodiment, the method includes switching to store the hibernation-related information using a high-speed storage configuration responsively to detecting that the host system is preparing to enter the hibernation state. In another embodiment, detecting that the host system is preparing to enter the hibernation state includes detecting one or more dedicated hibernation write commands received from the host system. Alternatively, detecting that the host system is preparing to enter the hibernation state includes detecting one or more write commands to storage locations belonging to the hibernation storage space. Further alternatively, detecting that the host system is preparing to enter the hibernation state includes receiving a notification from the host system indicating a preparation to enter the hibernation state.

In some embodiments, the method includes detecting that the host system is preparing to exit the hibernation state. In an embodiment, detecting that the host system is preparing to exit the hibernation state includes detecting one or more read commands from storage locations belonging to the hibernation storage space. In an alternative embodiment, detecting that the host system is preparing to exit the hibernation state includes receiving a notification from the host system indicating a preparation to exit the hibernation state.

In still another embodiment, performing the storage task includes using at least the portion of the hibernation storage space only responsively to verifying that the hibernation-related information is invalid. In another embodiment, the method includes marking the hibernation-related information as invalid after the host system exits from the hibernation state and retrieves the hibernation-related information from the non-volatile storage device. In yet another embodiment, the method includes, in preparation for entering the hibernation state, storing part of the hibernation-related information in the portion of the hibernation storage space used for performing the storage task.

In some embodiments, the method includes writing user data at a first throughput, and, in preparation for entering the hibernation state, writing the hibernation-related information to the hibernation storage space at a second throughput, higher than the first throughput. In an embodiment, the method includes, in preparation for entering the hibernation state, compressing the hibernation-related information and storing the compressed hibernation-related information in the hibernation storage space. In another embodiment, the method includes receiving a notification from the host system indicating that the host system is preparing to enter the hibernation state, and vacating the portion of the hibernation storage space in response to the notification.

There is additionally provided, in accordance with an embodiment of the present invention, a method for data storage, including:

accepting from a host system data, which belongs to one or more files that are organized in accordance with a file system, and storing the data in a non-volatile storage device;

processing the data stored in the non-volatile storage device so as to identify a file that was marked as invalid by the file system of the host system; and releasing a memory space occupied by the identified file in the non-volatile storage device.

There is also provided, in accordance with an embodiment of the present invention, apparatus for data storage, including:

a non-volatile memory; and a memory controller, which is configured to store data for a host system that operates alternately in a normal state and a hibernation state, to reserve a hibernation storage space in the non-volatile memory for storage of hibernation-related information in preparation for entering the hibernation state, and, while the host system is operating in the normal state, to perform a storage task other than storage of the hibernation-related information using at least a portion of the reserved hibernation storage space.

There is further provided, in accordance with an embodiment of the present invention, apparatus for data storage, including:

a non-volatile memory; and a memory controller, which is configured to accept from a host system data belonging to one or more files that are organized in accordance with a file system, to store the data in the non-volatile storage device, to process the data stored in the non-volatile storage device so as to identify a file that was marked as invalid by the file system of the host system, and to release a memory space occupied by the identified file in the non-volatile storage device.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for operating non-volatile storage devices (e.g., Solid-State Disks-SSD) in computing systems that support a hibernation state. The term "hibernation state" refers to any operational state in which the computing system reduces its energy consumption by deactivating at least part of its circuitry, and backs-up certain information to non-volatile storage before entering this operational state. Operational states or modes that are sometimes referred to as "standby," "sleep" or "battery-save" are also regarded herein as hibernation states.

In some embodiments, a host system stores data in a non-volatile storage device, which comprises a non-volatile memory and a memory controller. The host system supports a hibernation state and a normal state, and may alternate between the two states. When preparing to enter the hibernation state, the host system creates a hibernation file containing hibernation-related information, and stores the hibernation file in a reserved hibernation storage space in the non-volatile memory. When returning from the hibernation state to the normal stage, the host system retrieves the hibernation file and uses the hibernation-related information to resume normal operation.

In some embodiments of the present invention, the memory controller reuses the reserved hibernation storage space for storage tasks other than storing the hibernation-related information while the host system is operating in the normal state. In some embodiments, the memory controller accepts user data for storage from the host system, and stores the user data in storage locations that are outside the hibernation storage space. The memory controller manages the storage of the user data, however, using at least part of the hibernation storage space. The memory controller may use the hibernation storage space for various functions. Several examples of such uses, e.g., over-provisioning and binary caching, are described herein.

In some embodiments, the hibernation storage space is reserved by the host system, and the memory controller automatically identifies at least some storage locations belonging to the hibernation storage space, and uses the identified locations for storage management or other tasks.

In many practical systems, the hibernation storage space occupies a considerable portion of the non-volatile storage device, but is largely unused during normal operation. The disclosed techniques enable the memory controller to exploit this storage resource, and to improve storage speed and reliability by reusing it.

System Description

Figure 1:
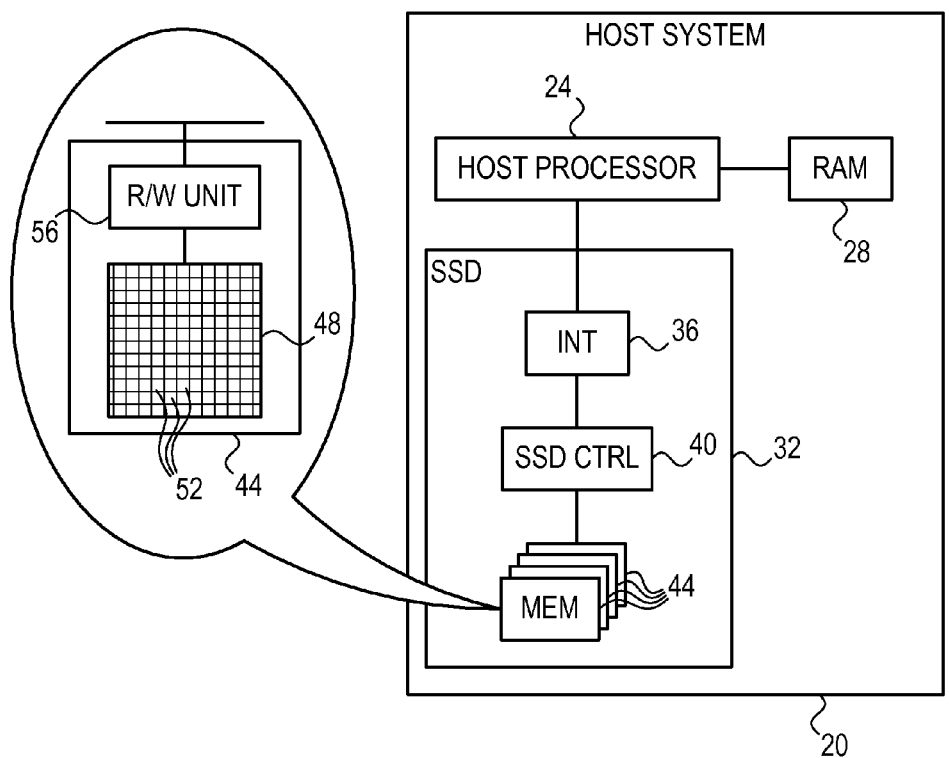
FIG. 1 is a block diagram that schematically illustrates a computing device that supports a hibernation state, in accordance with an embodiment of the present invention.

FIG. 1 is a block diagram that schematically illustrates a host system 20 that supports a hibernation state, in accordance with an embodiment of the present invention. In the present example, system 20 comprises a mobile computing device such as a notebook or laptop computer. Alternatively, the methods and systems described herein can be used in other computing devices such as Personal Digital Assistants (PDAs), in mobile communication terminals such as mobile phones, or in any other suitable host system.

Host system 20 comprises a host processor 24. The host processor typically runs a certain Operating System (OS), and may run any desired number of software applications. Host system 20 comprises a Random Access Memory (RAM) 28, in which host processor 24 stores data, program instructions and/or any other information. In addition, host system 20 comprises a non-volatile storage device, in the present example a Solid-State Disk (SSD) 32. SSD 32 comprises a host interface 36 for communicating with host processor 24, an SSD controller 40, and one or more non-volatile memory devices 44. Each memory device 44 comprises an array 48 of multiple analog memory cells 52. A Read/Write (R/W) unit 56 writes data into memory cells 52 of array 48, and retrieves data from the memory cells.

In the context of the present patent application and in the claims, the term "analog memory cell" is used to describe any memory cell that holds a continuous, analog value of a physical parameter, such as an electrical voltage or charge. Array 48 may comprise analog memory cells of any kind, such as, for example, NAND, NOR and Charge Trap Flash (CTF) Flash cells, phase change RAM (PRAM, also referred to as Phase Change Memory-PCM), Nitride Read Only Memory (NROM), Ferroelectric RAM (FRAM), magnetic RAM (MRAM) and/or Dynamic RAM (DRAM) cells. Flash memory devices are described, for example, by Bez et al., in "Introduction to Flash Memory," Proceedings of the IEEE, volume 91, number 4, April, 2003, pages 489-502, which is incorporated herein by reference. Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

NROM cells are described by Eitan et al., in "Can NROM, a 2-bit, Trapping Storage NVM Cell, Give a Real Challenge to Floating Gate Cells?" Proceedings of the 1999 International Conference on Solid State Devices and Materials (SSDM), Tokyo, Japan, Sep. 21-24, 1999, pages 522-524, which is incorporated herein by reference. NROM cells are also described by Maayan et al., in "A 512 Mb NROM Flash Data Storage Memory with 8 MB/s Data Rate", Proceedings of the 2002 IEEE International Solid-State Circuits Conference (ISSCC 2002), San Francisco, Calif., Feb. 3-7, 2002, pages 100-101, which is incorporated herein by reference. FRAM, MRAM and PRAM cells are described, for example, by Kim and Koh in "Future Memory Technology including Emerging New Memories," Proceedings of the $24^{th}$ International Conference on Microelectronics (MIEL), Nis, Serbia and Montenegro, May 16-19, 2004, volume 1, pages 377-384, which is incorporated herein by reference.

The charge levels stored in memory cells 52 and/or the analog voltages or currents written into and read out of the memory cells are referred to herein collectively as analog values or storage values. The storage values may comprise threshold voltages, electrical charge levels, or any other suitable kind of storage values. R/W unit 56 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell. Typically, R/W unit 56 converts data for storage in the memory device to analog storage values, and writes them into memory cells 52. When reading data out of array 48, R/W unit 56 converts the storage values of memory cells 52 into digital samples. Data is typically written to and read from the memory cells in groups that are referred to as pages. The R/W unit erases a block of cells 52 by applying one or more negative erasure pulses to the cells.

Some or all of the functions of SSD controller 40 may be implemented in hardware. Alternatively, SSD controller 40 may comprise a microprocessor that runs suitable software, or a combination of hardware and software elements. In some embodiments, SSD controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The configuration of FIG. 1 is an exemplary system configuration, which is shown purely for the sake of conceptual clarity. Any other suitable memory system configuration can also be used. Elements that are not necessary for understanding the principles of the present invention have been omitted from the figure for clarity. In the example system configuration shown in FIG. 1, memory devices 44 and SSD controller 40 are implemented as two separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD circuitry may reside on the same die on which one or more of the memory devices are disposed. Further alternatively, some or all of the functionality of SSD controller 40 can be implemented in software and carried out by host processor 24. In some embodiments, host processor 24 and SSD controller 40 may be fabricated on the same die, or on separate dies in the same device package.

In an example configuration of array 48, memory cells 52 are arranged in multiple rows and columns, and each memory cell comprises a floating-gate transistor. The gates of the transistors in each row are connected by word lines, and the sources of the transistors in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells. In a typical implementation, a two-bit-per-cell memory device may have four pages per row, a three-bit-per-cell memory device may have six pages per row, and a four-bit-per-cell memory device may have eight pages per row.

Erasing of cells is usually carried out in blocks that contain multiple pages. Typical memory devices may comprise several thousand erasure blocks. In some two-bit-per-cell MLC devices, each erasure block is on the order of thirty-two word lines, each comprising several tens of thousands of memory cells. Each word line of such a device is often partitioned into four pages (odd/even order cells, least/most significant bit of the cells). Three-bit-per cell devices having thirty-two word lines per erasure block would have 192 pages per erasure block, and four-bit-per-cell devices would have 256 pages per block. Alternatively, other block sizes and configurations can also be used. Some memory devices comprise two or more separate memory cell arrays, often referred to as planes. Since each plane has a certain "busy" period between successive write operations, data can be written alternately to the different planes in order to increase programming speed.

Typically, host processor 24 reads and writes data in SSD 32 by specifying logical addresses of the data (e.g., using Logical Block Addressing—LBA). SSD controller 40 translates the logical addresses into respective physical storage locations in memory devices 44. Typically, the host processor is unaware of the actual physical storage locations in which the data is stored, and the logical-to-physical translation may change over time.

Using Hibernation Storage Space for Storage Management Functions

Host system 20 supports at least two operational states—a normal state and a hibernation state. When operating in the normal state, host processor 24, RAM 28 and SSD 32 are connected to electrical power and are fully operational. When operating in the hibernation state, at least some of the elements of host system 20 are deactivated in order to save power. When preparing to enter the hibernation state, host processor 24 sends hibernation-related information for storage in SSD 32. Upon returning to normal operation, the hibernation-related information enables the host processor to resume operation of host system 20 from the point it began hibernating. The hibernation-related information may comprise, for example, the state and variables of the operating system and of the applications running on processor 24, information stored in RAM 28, or any other suitable information.

In some embodiments, when preparing to enter hibernation, the host processor builds a hibernation file and stores the hibernation file in SSD 32 (main storage). When returning from the hibernation state to the normal state, the host processor retrieves the hibernation file from the SSD, extracts the hibernation-related information from the file, and resumes the host system operation using the extracted information.

Typically, host processor 24 pre-assigns and reserves a certain logical storage space in SSD 32 (i.e., a certain set of logical addresses or LBAs) for the hibernation file. This space is referred to herein as "hibernation storage space." During normal operation, the user data is not stored in this space. The hibernation storage space is reserved in order to ensure that sufficient space is available for storing the hibernation file when necessary. Any suitable memory size may be reserved. Since the hibernation storage space is specified in terms of logical addresses, the physical storage location of the hibernation file in memory devices 44 may change over time. Typically although not necessarily, the hibernation storage space is on the order of the size of RAM 28.

As can be appreciated, the hibernation storage space may occupy a considerable portion of the total storage capacity of SSD 32. (In an example embodiment, the total RAM size is on the order of 2-4 GB, and the SSD main storage capacity is on the order of 64-256 GB. In alternative embodiments, any other suitable RAM and SSD sizes can also be used.) The hibernation storage space is accessed when preparing to enter hibernation and upon returning from hibernation to normal operation, and is otherwise mostly unused during normal operation.

In some embodiments, SSD controller 40 uses at least part of the hibernation storage space in SSD 32 for performing storage management functions when operating in the normal operation state. When devices 44 comprise Flash devices, the storage management functions are sometimes referred to as "Flash management." For example, the SSD controller may use the hibernation storage space for increasing the over-provisioning ratio, to serve as a binary cache, or for any other suitable purpose. The over-provisioning and binary cache examples are described in detail further below. These uses of the hibernation storage space are typically temporary in nature, since the SSD controller is usually requested to make the hibernation storage space available for storing the hibernation file upon entering hibernation. The embodiments described herein address mainly storage management (e.g., Flash management) functions. In alternative embodiments, however, the SSD controller may use the hibernation storage space for storing data or for any other suitable purpose when the host system operates in the normal state.

Figure 2:
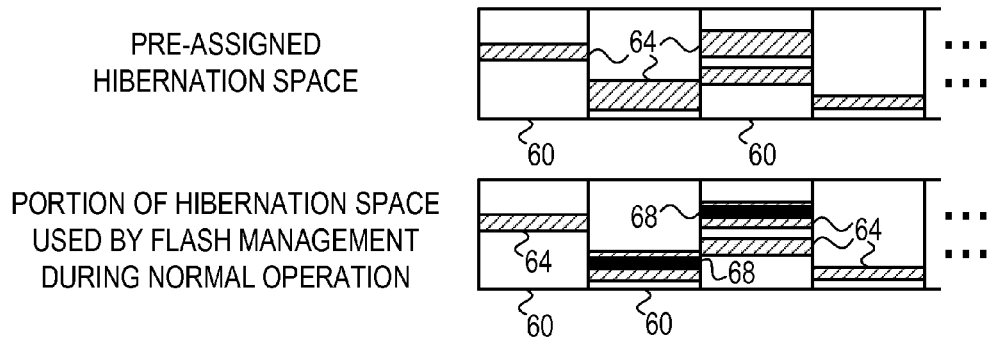
FIG. 2 is a diagram that schematically illustrates a hibernation storage space used for storage management during normal operation, in accordance with an embodiment of the present invention.

FIG. 2 is a diagram that schematically illustrates a hibernation storage space used for storage management during normal operation, in accordance with an embodiment of the present invention. As seen at the top of the figure, the overall memory space in devices 44 comprises multiple memory blocks 60. A certain portion of the total memory space is reserved as a hibernation storage space 64. The hibernation storage space may comprise any suitable number of pages or parts of pages, and may be distributed among memory blocks 60 in any suitable manner.

The bottom of FIG. 2 shows a portion 68 of hibernation storage space 64, which is used by SSD controller 40 for storage management functions. In some embodiments, SSD controller 40 uses all of space 64 for storage management. Alternatively, the SSD controller may use only part of the hibernation storage space for this purpose.

As explained above, the host processor reserves a certain set of logical addresses to serve as hibernation storage space 64, i.e., for storing the hibernation file. The physical storage location of the hibernation file in memory devices 44 may change over time. Portion 68, which is used for storage management, may also comprise a set of logical addresses whose corresponding physical storage locations may change over time.

SSD controller 40 may identify whether the host system is currently in the normal state or in the hibernation state, and/or whether the host system is currently entering or exiting the hibernation state. Moreover, the SSD controller may identify the logical addresses (e.g., LBAs) in which the hibernation-related information (e.g., hibernation file) is stored. These identification tasks can be performed based on suitable notifications from the host processor, or automatically regardless of any host notification. Several examples of such techniques are described below.

In some embodiments, SSD controller 40 identifies at least some of the (logical or physical) locations of the hibernation storage space automatically, i.e., without being notified of these locations by host processor 24. For example, the SSD controller may automatically identify the size and storage locations (e.g., LBAs) of a file named "HIBERFILE.SYS" that holds the hibernation-related information. The file name and attributes may change with the type of file system used by the host processor.

SSD controller 40 may identify the storage locations of the hibernation file HIBERFILE.SYS using various techniques. In an example embodiment, controller 40 first identifies the Master File Table (MFT) record corresponding to HIBERFILE.SYS in the root folder. The SSD controller may, for example, search exhaustively through the MFT records. This technique does not require support of NT File System (NTFS) features in the SSD controller, but on the other hand is relatively time-consuming. Alternatively, the SSD controller may open the root folder data and search this data for HIBER- FILE.SYS. This technique is fast, but may require the SSD controller to support various NTFS features in order to parse the root folder data.

Having identified the MFT record corresponding to HIBERFILE.SYS, the SSD controller opens this record and parses its attached attributes. In some embodiments, the SSD controller verifies, using the record attributes, that the record in question is still valid and still references HIBERFILE.SYS (a precaution against a scenario in which the host decides to stop hibernation and lets a different file occupy this record space).

From the record attributes, the SSD controller finds the fragments (typically start/end cluster pairs) that specify the storage locations of the hibernation file HIBERFILE.SYS. In some cases, the file is not fragmented, in which case a single start/end pair would indicate the storage location of the entire file. In other cases, the file is fragmented into several fragments, in which case the MFT record would contain the descriptions of all the start/end cluster pairs specifying the file's storage locations. In some cases, the file is heavily fragmented, such that the MFT record is too small to hold all the relevant location descriptions. In these cases, the MFT record typically contains an attribute that indicates a cluster range holding the full list of start/end cluster pairs. In any of these cases, the SSD controller analyzes the content of the MFT record in order to find the storage locations assigned to the hibernation file.

In alternative embodiments, the host processor may store the hibernation file using a dedicated "WRITE_HIBERNATE_DATA" command, which is different from the write command used for storing user data. In these embodiments, the SSD controller can identify the storage locations (e.g., LBAs) that are written using the "WRITE_HIBERNATE_DATA" command, and conclude that these locations correspond to the hibernation storage space. Having identified the location of the hibernation storage space, the SSD controller may use at least part of this space for storage management. Alternatively, the SSD controller may receive a notification from the host processor, indicating the logical addresses in which the hibernation file is stored.

SSD Operation Method Description

Figure 3:
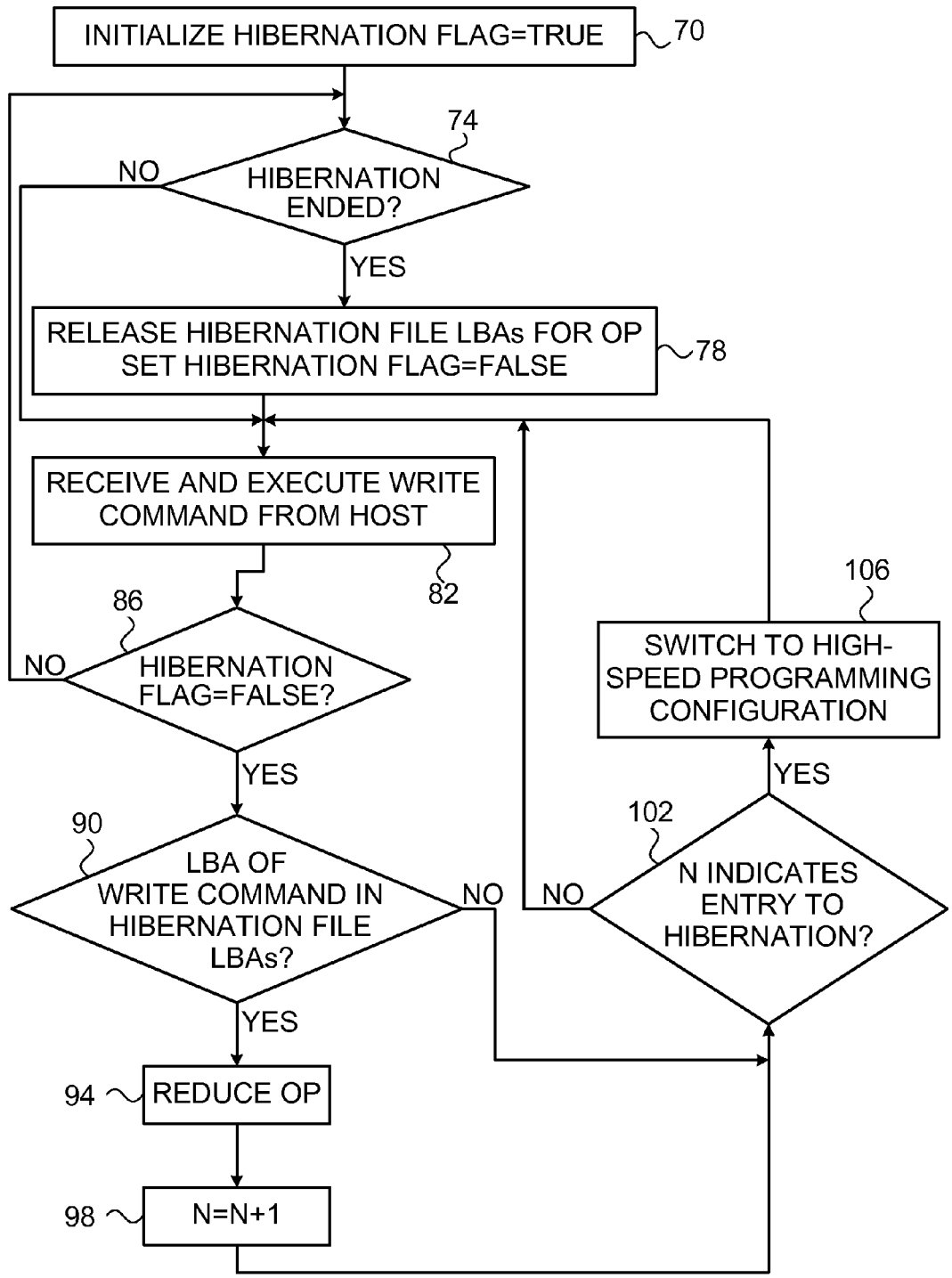
FIG. 3 is a flow chart that schematically illustrates a method for operating a Solid-State Disk (SSD) in a computing device that supports hibernation, in accordance with an embodiment of the present invention.

FIG. 3 is a flow chart that schematically illustrates a method for operating SSD 32, in accordance with an embodiment of the present invention. In this method, the SSD controller releases logical storage space (LBAs in the present example) that is used by the hibernation file for other purposes when the host system is not in hibernation. In the present embodiment, the SSD controller automatically detects situations in which the host system prepares to enter the hibernation state, by detecting multiple write commands to the hibernation storage space. Such multiple write commands are assumed to indicate that the host processor has started to copy the content of RAM 28 into the hibernation file. Upon detecting this event, the SSD controller switches to storage using a high-speed configuration, in order to speed-up entry to hibernation.

The method of FIG. 3 begins with SSD controller 40 initializing following boot of the host system, at an initialization step 70. At this stage, the host system is assumed to be in the hibernation state. Thus, the SSD controller initializes an internal flag denoted HIBERNATION FLAG to TRUE.

The SSD controller checks whether the host system has ended the hibernation state, at a hibernation checking step 74. In an example embodiment, the SSD controller examines the content of memory devices 44, finds the file system tree, and in particular identifies the hibernation file HIBERFILE.SYS. The SSD then examines the data in the first cluster of the hibernation file, and checks whether this data is all-zeros or not. (Typically, examining the first four bytes of the first cluster is sufficient for determining whether the hibernation file is valid or not.) If the beginning of first cluster is non-zero, then the hibernation file is valid, meaning that the host system is still in the hibernation state. If the beginning of the first cluster is all-zero, the SSD controller concludes that the host processor has marked the hibernation file as invalid, and therefore the host system is no longer in the hibernation state. Alternatively, the SSD controller may decide whether or not hibernation has ended based on a notification from the host processor, or using any other suitable method.

If the SSD controller concludes that the host system exited the hibernation state and entered the normal state, the SSD controller releases at least some of the logical addresses (LBAs in the present example) that were occupied by the (now invalid) hibernation file, at a LBA releasing step 78. The released LBAs can be used by the SSD controller for other purposes, e.g., for serving as additional over-provisioning space.

In some embodiments, the SSD controller determines which LBAs are occupied by the hibernation file by examining the file system information stored in memory devices 44. In alternative embodiments, the SSD controller is notified by the host processor as to the LBAs used for storing the hibernation file. The SSD controller typically finds the physical storage locations in memory devices 44 that correspond to these LBAs.

In some embodiments, the SSD controller may find the LBAs used by the hibernation file at any other suitable time, not necessarily when exiting from hibernation. Upon releasing the hibernation file LBAs, the SSD controller sets the HIBERNATION FLAG to FALSE. If the SSD controller concludes, at step 74 above, that the host system is still in hibernation, then step 78 is skipped, i.e., the LBAs of the hibernation file are not released.

The SSD controller receives and executes a write command accepted from the host system, at a writing step 82. The SSD controller stores the data received in the write command in memory devices 44. This write command may be written to a LBA that is part of the hibernation storage space (i.e., to a LBA that is used by the hibernation file) or to a LBA that is outside the hibernation storage space. The SSD controller now checks whether the host system is in hibernation, at a state checking step 86. The SSD controller may determine the system state using any of the techniques described herein. If the host system is in hibernation, the method loops back to step 74 above.

If the host system is not in hibernation, the SSD controller evaluates a criterion for detecting whether the host system is currently preparing to enter the hibernation state. For this purpose, the SSD controller maintains a counter denoted N, which counts the number of write commands that are addressed to LBAs that belong to the hibernation storage space. If the SSD controller detects a certain number of such write commands, it concludes that the host processor has started backing-up the RAM content to the hibernation file. Upon detecting this event, the SSD controller switches to a high-speed programming configuration, in order to increase the speed at which the hibernation file is stored.

If step 86 concludes that the host system is not in hibernation, the SSD controller checks whether the LBA specified in the write command (received at step 82) is inside or outside the hibernation storage area, at a LBA checking step 90. If step 90 concludes that the write command was written into the hibernation storage area, the SSD controller reduces the over-provisioning overhead, at an over-provisioning reduction step 94. The SSD controller then increments N, at an incrementing step 98. If step 90 concludes that the write command was written outside the hibernation storage area, steps 94 and 98 are skipped.

The SSD controller checks whether the current value of N indicates that entry to hibernation has began, at an entry checking step 102. In an embodiment, the SSD controller compares N to a certain threshold and concludes that the host system is preparing to enter hibernation if N exceeds the threshold. In alternative embodiments, the SSD controller may use other techniques for detecting that the host processor has began storing the hibernation file. For example, the SSD controller may check whether one or more "WRITE HIBERNATION DATA" commands are accepted from the host processor. Further alternatively, any other suitable criterion can also be used.

If the SSD controller detects that the host system prepares to enter hibernation (i.e., is in the process of storing the hibernation file), the SSD controller begins storing data using a high-speed storage configuration, at a high-speed storage step 106. Storing the hibernation file at high speed is highly advantageous in many practical cases, such as when the host system enters hibernation because of low battery. Any suitable high-speed storage configuration can be used. In an example embodiment, the SSD controller normally stores data using multiple bits per cell (MLC), and at step 106 switches to store data using a single bit per cell (SLC). As another example, the SSD controller may begin storing data in parallel on a higher number of memory devices (e.g., dies) than the number of devices used for normal storage.

As yet another example, the SSD controller may switch to storing data using a SLC cache, which is later copied to MLC storage.

The method then loops back to step 82 for receiving and executing subsequent write commands from the host system. If the current value of N does not indicate entry to hibernation, step 106 is skipped, and the method loops back directly to step 82.

Additional Embodiments and Variations

In some embodiments, when the SSD controller determines that the host system returns to the normal state (and assuming the hibernation-related information has already been read by the host processor) the SSD controller marks the hibernation-related information as invalid. In some embodiments, after host processor 24 retrieves the hibernation file from the SSD, SSD controller 40 receives from the host processor a command instructing it to invalidate the hibernation file. The command may comprise a dedicated command that is defined specifically for invalidating the hibernation file. Alternatively, the host processor may invalidate the hibernation file using a command that is also used for other purposes, such as a TRIM command. For example, the Advanced Technology Attachment (ATA) protocol supports a "ATA DATA SET MANAGEMENT (TRIM)" command that can be used for this purpose. Other protocols may support similar commands.

Typically, the SSD controller marks the hibernation-related information as invalid, and sends an acknowledgement to the host processor. In alternative embodiments, the SSD controller can identify the storage locations used by the hibernation-related information, and mark these locations as invalid without explicit instructions from the host processor. Such mechanism is feasible, for example, in file systems such as File Allocation Table (FAT), FAT32, New Technology File System (NTFS), EX2, or in any other suitable file system in which the hibernation file has detectable attributes or characteristics.

The SSD controller may decide whether the hibernation-related information is valid or invalid using any suitable method. For example, in some embodiments the hibernation file is stored as a linked list of LBAs. In this configuration, each LBA comprises a portion of the hibernation-related information, and a link to the next LBA. As noted above, the beginning of first cluster of the hibernation file is all-zero if the hibernation file is invalid, and not all-zero if the hibernation file is valid. Thus, by checking the value of the beginning of first cluster in the first LBA of the hibernation file, the SSD controller can determine whether the hibernation-related information is valid or not. Alternatively, any other suitable technique can be used.

In some embodiments, the SSD controller detects certain data that is not related to hibernation but was nevertheless stored in the hibernation storage space by the host operating system. This sort of data will typically not be marked as invalid upon readout of the hibernation file, and the SSD controller will treat it similarly to user data. The space occupied by such data is typically not used for management functions.

In some embodiments, SSD controller 40 stores and/or retrieves the hibernation file using programming/readout operations that are different from the operations used for storing and retrieving user data. These programming/readout operations are typically faster than the respective operations used for user data, and thus increase the speed of switching to and from hibernation. Other performance parameters, such as power consumption, may be compromised in these operations, in order to increase speed.

In some embodiments, SSD controller 40 compresses the hibernation-related information before storing it in the hibernation storage space. The host processor may not be aware of this compression. The compression enables the SSD controller to reduce the size of the reserved hibernation storage space, and thus free memory resources for storing user data or for any other purpose. In addition, the time needed to store and retrieve the hibernation file can be shortened considerably. In alternative embodiments, compression of the hibernation-related information can be performed by the host processor operating system. Since the content of RAM 28 typically comprises executable code and data, compression ratios on the order of 30-40% can be achieved, providing a corresponding reduction in memory utilization and storage/retrieval time.

As explained above, in some embodiments the SSD controller identifies the LBAs occupied by the hibernation file HIBERFILE.SYS by scanning the file system information of the host system as it is stored in memory devices 44, identifying the linked chain of LBAs that stores this file, and checking whether the beginning of the first cluster of the hibernation file is zero (examining the first four bytes will typically suffice to determine if the hibernation file is valid or not, since usually the first 512 bytes are set to zero when the file is invalid). In some embodiments, the SSD controller can use this technique in order to identify other files that were declared invalid by the host system's file system. Once identified, the memory space occupied by such files can be released.

Example Storage Management Functions Using the Hibernation Storage Space

As explained above, SSD controller 40 can use some or all of the hibernation storage space for performing storage management functions as well as for storing other kinds of data and for other purposes. For example, the SSD controller may use the hibernation storage space to increase the over-provisioning overhead of the SSD. Over-provisioning is a mechanism deployed in Flash devices and other analog memory cell devices due to the fact that (1) Data is written in the device page-by-page, (2) memory cells cannot be overwritten and need to be erased first, and (3) memory cells are erased in memory block units, each block comprising multiple pages.

When using over-provisioning, the actual physical memory size that is available for storing data is larger than the specified memory capacity (i.e., the size of the address space accessible to the host processor). The ratio between the actual physical capacity and the specified capacity is typically defined as the over-provisioning ratio. Consider, for example, a SSD that is operating at an over-provisioning ratio of 15% and is fully-programmed from the point of view of the host processor. In this scenario, each memory block in the SSD will be, on average, only 85% programmed. On average, 15% of each memory block will comprise invalid data or un-programmed memory cells.

In order to erase memory blocks and make them available for programming, the SSD controller copies valid data from partially-programmed blocks, so as to condense the data and clear memory blocks for erasure. This process is sometimes referred to as garbage collection. As can be appreciated, the SSD needs to perform a number of programming operations per each new page being programmed. The average number of programming operations per each new page (sometimes referred to as write amplification) increases as a function of the over-provisioning ratio. Thus, the over-provisioning ratio has a considerable impact on the achievable SSD programming throughput. This effect is particularly noticeable when the SSD is fully or nearly fully programmed.

In some embodiments, SSD controller 40 uses the hibernation storage space to increase the over-provisioning ratio of the SSD. In other words, during normal operation, there is no need to reserve memory space for hibernation-related information, and this space can be used as extra over-provisioning space. As a result, the SSD programming throughput can be significantly increased. When preparing to enter hibernation, the hibernation storage area can no longer be used for over-provisioning, and the over-provisioning ratio is reduced accordingly.

Additionally or alternatively, SSD controller 40 can use some or all of the hibernation storage space as a write cache memory. In these embodiments, SSD controller 40 accepts user data for storage from host processor 24, caches the user data temporarily in the hibernation storage space, and later copies the cached data to long-term storage locations outside the hibernation storage space. Write caching can be used in various ways to improve programming performance. Storage schemes that use write caching are described, for example, in U.S. patent application Ser. Nos. 12/186,867, 12/332,370, 12/551,567 and 12/579,430, which are assigned to the assignee of the present patent application and whose disclosures are incorporated herein by reference.

In some embodiments, the SSD controller caches the user data in the hibernation storage space using a storage configuration that is optimized for throughput, possibly at the expense of other performance parameters such as retention or density. Later, the SSD controller copies the cached data to its long-term storage locations outside the hibernation storage space. The SSD controller may store the data in the long-term storage locations using a different storage configuration, typically having lower throughput. The long-term storage configuration may be optimized for retention and/or density. For example, the SSD controller may cache the user data using only two programming levels per memory cell (i.e., at a density of one bit per cell), and later store the data using a higher number of programming levels per memory cell (i.e., at a density of more than one bit per cell). Alternatively, any other caching and/or long-term storage configuration can be used.

In some embodiments, the SSD controller uses the hibernation storage space for storing data, e.g., user data or management data, while the host system is not in hibernation. When the host system prepares to enter hibernation, the SSD controller vacates this storage space, e.g., by copying the data to other storage locations outside the hibernation storage space, or by compressing the data. The SSD controller vacates the storage space, for example, in response to a notification from the host system indicating entry to hibernation.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data storage, comprising:
in a host system that operates alternately in a normal state and a hibernation state, reserving a hibernation storage space in a non-volatile storage device to store hibernation-related information in preparation for entering the hibernation state, wherein the non-volatile storage device includes multiple memory blocks allocated as a user data storage space, over-provisioning memory, and the hibernation storage space; and
while the host system is operating in the normal state:
allocating at least a portion of the hibernation storage space as over-provisioning memory, thereby allowing valid data to be copied from partially-programmed memory blocks in the user data storage space to the at least a portion of the hibernation storage space, and the valid data from the at least a portion of the hibernation storage space to be copied to the user data storage space subsequent to an erasure operation being performed one or more locations of the user data storage space.

2. The method according to claim 1, further comprising allocating at least another portion of the hibernation storage space as a cache, and caching user data accepted from the host system in the at least another portion of the hibernation storage space, and subsequently copying the cached user data to storage locations outside the hibernation storage space.

3. The method according to claim 2, wherein caching the user data comprises writing the user data to the hibernation storage space at a first storage throughput, and wherein copying the cached user data comprises storing the user data outside the hibernation storage space at a second storage throughput that is lower than the first storage throughput.

4. The method according to claim 1, wherein reserving the hibernation storage space comprises allocating a set of storage locations of the user data storage space by the host system to serve as the hibernation storage space, and wherein copying valid data to the at least a portion of the hibernation storage space comprises identifying at least part of the storage locations in the set, and using the identified storage locations.

5. The method according to claim 4, wherein identifying the storage locations in the set comprises receiving a notification from the host system indicative of the set of storage locations.

6. The method according to claim 4, wherein identifying the storage locations in the set comprises automatically identifying a file holding the hibernation-related information in a file system of the host system.

7. The method according to claim 4, further comprising, in preparation for entering the hibernation state, receiving the hibernation-related information from the host system using one or more dedicated hibernation write commands, wherein identifying the storage locations in the set comprises detecting the storage locations written to using the dedicated hibernation write commands.

8. The method according to claim 1, further comprising detecting that the host system is preparing to enter the hibernation state.

9. The method according to claim 8, further comprising, responsively to detecting that the host system is preparing to enter the hibernation state, switching to store the hibernation-related information using a high-speed storage configuration.

10. The method according to claim 8, wherein detecting that the host system is preparing to enter the hibernation state comprises detecting one or more dedicated hibernation write commands received from the host system.

11. The method according to claim 8, wherein detecting that the host system is preparing to enter the hibernation state comprises detecting one or more write commands to storage locations belonging to the hibernation storage space.

12. The method according to claim 8, wherein detecting that the host system is preparing to enter the hibernation state comprises receiving a notification from the host system indicating a preparation to enter the hibernation state.

13. The method according to claim 1, further comprising detecting that the host system is preparing to exit the hibernation state.

14. The method according to claim 13, wherein detecting that the host system is preparing to exit the hibernation state comprises detecting one or more read commands from storage locations belonging to the hibernation storage space.

15. The method according to claim 13, wherein detecting that the host system is preparing to exit the hibernation state comprises receiving a notification from the host system indicating a preparation to exit the hibernation state.

16. The method according to claim 1, further comprising copying valid data from the partially-programmed memory blocks in the user data storage space to the at least the portion of the hibernation storage space only responsively to verifying that the hibernation-related information is invalid.

17. The method according to claim 1, further comprising, after the host system exits from the hibernation state and retrieves the hibernation-related information from the non-volatile storage device, marking the hibernation-related information as invalid.

18. The method according to claim 1, further comprising, in preparation for entering the hibernation state, storing part of the hibernation-related information in the at least a portion of the hibernation storage space.

19. The method according to claim 1, further comprising writing user data at a first throughput, and, in preparation for entering the hibernation state, writing the hibernation-related information to the hibernation storage space at a second throughput, higher than the first throughput.

20. The method according to claim 1, further comprising, in preparation for entering the hibernation state, compressing the hibernation-related information and storing the compressed hibernation-related information in the hibernation storage space.

21. The method according to claim 1, further comprising receiving a notification from the host system indicating that the host system is preparing to enter the hibernation state, and vacating the at least a portion of the hibernation storage space in response to the notification.

22. Apparatus for data storage, comprising:
a non-volatile memory including multiple memory blocks; and
a memory controller coupled to the non-volatile memory and configured to:
store data for a host system that operates alternately in a normal state and a hibernation state;
allocate the multiple memory blocks as a user data storage space, over-provisioning memory, and to reserve a hibernation storage space in the non-volatile memory to store hibernation-related information in preparation for entering the hibernation state; and
while the host system is operating in the normal state, the memory controller is configured to allocate at least a portion of the hibernation storage space as over-provisioning memory, thereby allowing valid data to be copied from partially-programmed memory blocks in the user data storage space to the at least a portion of the hibernation storage space, and the valid data from the at least a portion of the hibernation storage space to be copied to the user data storage space subsequent to an erasure operation being performed one or more locations of the user data storage space.

23. The apparatus according to claim 22, wherein the memory controller is configured to allocate at least another portion of the hibernation storage space as a cache, and to cache user data accepted from the host system in the at least another portion of the hibernation storage space, and to subsequently copy the cached user data to storage locations outside the hibernation storage space.

24. The apparatus according to claim 23, wherein the memory controller is configured to cache the user data in the hibernation storage space at a first storage throughput, and to store the user data outside the hibernation storage space at a second storage throughput that is lower than the first storage throughput.

25. The apparatus according to claim 22, wherein a set of storage locations of the user data storage space is identified by the host system to serve as the hibernation storage space, and wherein the memory controller is configured to identify at least part of the storage locations in the set, and to manage the storage using the identified storage locations.

26. The apparatus according to claim 25, wherein the memory controller is configured to identify the storage locations in the set by receiving a notification from the host system indicative of the set of storage locations.

27. The apparatus according to claim 25, wherein the memory controller is configured to identify the storage locations in the set by automatically identifying a file holding the hibernation-related information in a file system of the host system.

28. The apparatus according to claim 25, wherein the memory controller is configured to receive the hibernation-related information from the host system using one or more dedicated hibernation write commands, and to identify the storage locations in the set by detecting the storage locations written to using the dedicated hibernation write commands.

29. The apparatus according to claim 22, wherein the memory controller is configured to detect that the host system is preparing to enter the hibernation state.

30. The apparatus according to claim 29, wherein the memory controller is configured to switch to store the hibernation-related information using a high-speed storage configuration responsively to detecting that the host system is preparing to enter the hibernation state.

31. The apparatus according to claim 29, wherein the memory controller is configured to detect that the host system is preparing to enter the hibernation state by detecting one or more dedicated hibernation write commands received from the host system.

32. The apparatus according to claim 29, wherein the memory controller is configured to detect that the host system is preparing to enter the hibernation state by detecting one or more write commands to storage locations belonging to the hibernation storage space.

33. The apparatus according to claim 29, wherein the memory controller is configured to detect that the host system is preparing to enter the hibernation state by receiving a notification from the host system indicating a preparation to enter the hibernation state.

34. The apparatus according to claim 22, wherein the memory controller is configured to detect that the host system is preparing to exit the hibernation state.

35. The apparatus according to claim 34, wherein the memory controller is configured to detect that the host system is preparing to exit the hibernation state by detecting one or more read commands from storage locations belonging to the hibernation storage space.

36. The apparatus according to claim 34, wherein the memory controller is configured to detect that the host system is preparing to exit the hibernation state by receiving a notification from the host system indicating a preparation to exit the hibernation state.

37. The apparatus according to claim 22, wherein the memory controller is configured to copy valid data from the partially-programmed memory blocks in the user data storage space to the at least the portion of the hibernation storage space only responsively to verifying that the hibernation-related information is invalid.

38. The apparatus according to claim 22, wherein, after the host system exits from the hibernation state and retrieves the hibernation-related information from the non-volatile storage device, the memory controller is configured to mark the hibernation-related information as invalid.

39. The apparatus according to claim 22, wherein, in preparation for entering the hibernation state, the memory controller is configured to store part of the hibernation-related information in the at least a portion of the hibernation storage space.

40. The apparatus according to claim 22, wherein the memory controller is configured to write user data at a first throughput, and to write the hibernation-related information to the hibernation storage space at a second throughput, higher than the first throughput.

41. The apparatus according to claim 22, wherein, in preparation for entering the hibernation state, the memory controller is configured to compress the hibernation-related information and store the compressed hibernation-related information in the hibernation storage space.

42. The apparatus according to claim 22, wherein the memory controller is configured to receive a notification from the host system indicating that the host system is preparing to enter the hibernation state, and to vacate the at least a portion of the hibernation storage space in response to the notification.

* * * * *